(12) United States Patent
Strobel et al.

(10) Patent No.: US 8,322,371 B2
(45) Date of Patent: Dec. 4, 2012

(54) BALL SEAT VALVE, USE OF THE SAME, AND METHOD FOR CONTROLLING A VALVE ASSEMBLY COMPRISING A BALL SEAT VALVE

(75) Inventors: Gerd Strobel, Villingen-Schweningen (DE); Florian Schulz, Villingen-Schweningen (DE)

(73) Assignee: Kendrion (Villingen) GmbH, Villingen-Schwenningen (DE)

( * ) Notice: Subject to any disclaimer, the term of this patent is extended or adjusted under 35 U.S.C. 154(b) by 503 days.

(21) Appl. No.: 12/538,031

(22) Filed: Aug. 7, 2009

(65) Prior Publication Data
US 2010/0032606 A1 Feb. 11, 2010

(30) Foreign Application Priority Data
Aug. 8, 2008 (DE) .......... 10 2008 036 966

(51) Int. Cl.
*F16K 7/18* (2006.01)
(52) U.S. Cl. .......... 137/625.28; 137/550; 137/901; 251/118
(58) Field of Classification Search .......... 137/625.38, 137/625.33, 901, 544, 550, 625.28; 251/339, 251/321, 149.6, 118
See application file for complete search history.

(56) References Cited

U.S. PATENT DOCUMENTS

| | | | | |
|---|---|---|---|---|
| 2,229,499 A | * | 1/1941 | Fisette | 188/112 R |
| 4,150,693 A | * | 4/1979 | Genevey et al. | 137/625.3 |
| 5,836,350 A | * | 11/1998 | Sakaguchi et al. | 137/550 |
| 6,131,608 A | * | 10/2000 | Lu | 137/550 |
| 6,401,697 B1 | * | 6/2002 | Banzhaf | 123/510 |
| 7,080,661 B1 | * | 7/2006 | Ayer et al. | 137/550 |

FOREIGN PATENT DOCUMENTS

| | | |
|---|---|---|
| DE | 1 961 838 U | 6/1967 |
| DE | 43 07 159 A1 | 9/1994 |
| FR | 1 474 771 A | 11/1965 |
| JP | 08 200 519 A | 8/1996 |

OTHER PUBLICATIONS

German Office Action issued Jul. 17, 2009 for Appln. Serial No. DE 10 2008 036966.7 filed Aug. 8, 2008, 8 pages.

* cited by examiner

*Primary Examiner* — John Fox
*Assistant Examiner* — Seth Faulb
(74) *Attorney, Agent, or Firm* — Andrew F. Young, Esq.; Lackenbach Siegel, LLP

(57) ABSTRACT

A ball seat valve, use thereof, and method for controlling a valve assembly comprising a ball seat valve, wherein the valve body has a chamber and a plurality of inlet openings in the chamber. The inlet openings together have an inflow area leading into the chamber through which a medium can flow, and wherein the medium flows through said openings simultaneously as these are connected to one another in parallel. The valve has a seat with an outlet opening leading out of the chamber through the valve body, and wherein the outlet opening has an outflow area leading out of the chamber through which the medium can flow. Additionally, the valve has a ball which is situated in the chamber so as to be displaceable to open up or block the outlet opening. It is advantageous that the plurality of inlet openings comprise more than 10, especially more than 50, individual such inlet openings, resulting in a decrease in pressure between the inflowing medium outside and that inside the chamber.

20 Claims, 2 Drawing Sheets

BALL SEAT VALVE, USE OF THE SAME, AND
METHOD FOR CONTROLLING A VALVE
ASSEMBLY COMPRISING A BALL SEAT
VALVE

CROSS REFERENCE TO RELATED
APPLICATIONS

This application claims priority from German Patent Application No. 10 2008 036 966.7, filed Aug. 8, 2008, the entire contents of which are herein incorporated fully by reference for all purposes.

FIGURE FOR PUBLICATION

FIG. 1.

BACKGROUND OF THE INVENTION

1. Field of the Invention

The present invention relates to a ball seat valve. More specifically, the present invention relates to a ball seat valve configured so as to reduce or prevent pressure pulsations in the volume flow of the medium flowing out of the chamber of the ball seat valve and to reduce the pressure between the in flowing medium outside and inside the chamber 2. Description of the Related Art One example of a prior art ball seat valve is shown in FIG. 3 in a lateral cross section view and a plan view. The ball seat valve has a valve body 1 with a chamber 2 into which four large inlet openings 3\* lead through a cover-like wall. A seat 4 with an outlet opening 6 is formed in the wall of the valve body 1 opposite the inlet openings 3\*, with the outlet opening leading out of the chamber 2 through the valve body 1. A ball 5 is situated in the chamber 2 such that it can be displaced to open up or block the outlet opening 6. A flexible element 8 forces the ball 5 into a normal position in which it blocks the outlet opening 6 in the seat 4 by pre-stressing the ball 5 against the outlet opening 6 from a side opposite the outlet opening 6. The ball 5 can be forced out of the seat 4 in the opposite direction, against the force of the flexible element 8, by a tappet 9, which can be inserted from the opposite side through the outlet opening 6 so as to open up the outlet opening 6.

The dimensions of the inlet openings 3\* are such that each opening has a flow-through inflow area $A1^*$ leading into the chamber 2 that is larger than a flow-through outflow area $A2$ of the outlet opening 6.

The total inflow area $\Sigma A1^*$ of all the inlet openings 3\* is consequently very large as compared with the flow-through outflow area $A2$ of the outlet opening 6. When a medium M having a high and potentially pulsating external pressure $p1$ flows up to the inlet openings 3\*, it enters the chamber 2 through the inlet openings 3\*, and then exits the same through the outlet opening 6 when outlet opening 6 is open. Because each of the inlet openings 3\* has a large inflow area $A1^*$ as compared with the outflow area $A2$ of the outlet opening 6, a chamber pressure $p2^*$ is created during the flow through the chamber 2, which is approximately equal to the external pressure $p1$.

The volume flow $Q^*$ exiting after flowing through a ball seat valve of this type is heavily dependent upon the initial pressure that prevails in the chamber 2 as chamber pressure $p2^*$. Based upon the initial pressure, the valve is highly sensitive to pressure pulses with high pressure frequencies. Pressure pulses initially cause a rapid increase in flow rate. After a short time, however, the ball 5 is forced into the seat 4 by the increased flow or volume flow $Q^*$ of the flowing medium M. The operating point becomes unstable because the ball-closing forces fluctuate while the ball-opening forces, which act on the ball 5 via the tappet 9, remain the same.

As a result, the chamber pressure $p2^*$ prevailing in the conventional chamber 2 is essentially equal to the external pressure $p1$, as is illustrated in FIG. 4. This diagram shows pressure pulses $ip2^*$ having a clearly identifiable amplitude or intensity I, recurring over time t. These cause corresponding fluctuations in a curve illustrating volume flow $Q^*$, shown at the bottom, which indicates corresponding flow-through pulses or fluctuations, each comprising an intensity increase followed by an intensity decrease in the volume flow $Q^*$.

Accordingly, there is a need for an improved ball seat valve wherein: the structure is less sensitive to pressure pulses; where a more uniform flow of the medium is provided; where there is an elimination of sensitivity of the ball to a bumping of the seat, resulting in a decrease in wear and tear; and, there is a filter effect, which keeps particles of dirt from reaching the interior of the valve.

ASPECTS AND SUMMARY OF THE
INVENTION

An aspect of the present invention is the provision of a ball seat valve so as to reduce or prevent pressure pulsations in the volume flow of the medium flowing out of the chamber of the ball seat valve.

Another aspect of the present invention is to provide an improved ball seat valve wherein: the structure is less sensitive to pressure pulses; where a more uniform flow of the medium is provided; where there is an elimination of sensitivity of the ball to a bumping of the seat, resulting in a decrease in wear and tear; and, there is a filter effect, which keeps particles of dirt from reaching the interior of the valve.

The present invention relates to a ball seat valve, use thereof, and method for controlling a valve assembly comprising a ball seat valve, wherein the valve body has a chamber and a plurality of inlet openings in the chamber. The inlet openings together have an inflow area leading into the chamber through which a medium can flow, and wherein the medium flows through said openings simultaneously as these are connected to one another in parallel. The valve has a seat with an outlet opening leading out of the chamber through the valve body, and wherein the outlet opening has an outflow area leading out of the chamber through which the medium can flow. Additionally, the valve has a ball which is situated in the chamber so as to be displaceable to open up or block the outlet opening. It is advantageous that the plurality of inlet openings comprise more than 10, especially more than 50, individual such inlet openings, resulting in a decrease in pressure between the inflowing medium outside and that inside the chamber.

According to an embodiment of the present invention, there is provided a ball seat valve which comprises a valve body with a chamber, a plurality of inlet openings into the chamber, wherein said inlet openings together have an inflow area into the chamber through which medium can flow, and wherein the medium flows through these openings simultaneously, as they are connected in parallel with one another, a seat with an outlet opening leading out of the chamber through the valve body, wherein the outlet opening has all outlet area leading out of the chamber, through which the medium can flow, and a ball, which is displaceably situated in the chamber so as to open up or block the outlet opening, wherein it is advantageous for the plurality of inlet openings to comprise more than 10, especially more than 50 such individual inlet openings connected in parallel with one another.

With the large number of inlet openings, which implicitly requires a reduction of the diameter of the individual inlet openings so as to allow a large number of inlet openings to be provided, a decrease in pressure from outside the chamber to the interior of the chamber occurs. This decrease in pressure causes a reduction in the chamber pressure, which leads to an advantageous reduction of pressure pulses, resulting in a more uniform volume flow into the outlet opening.

The parameters of the various components of this type of ball seat valve are dependent upon the medium and its physical and optionally its chemical parameters, in other words, especially upon the viscosity and flow rate of the medium flowing into the chamber. The higher the rate or pressure of the inflowing medium, and the lower the viscosity of the inflowing medium, the greater the corresponding number of inlet openings must be in order to achieve a sufficient drop in pressure for the pressure pulses to be reduced or, ideally, entirely prevented. It should be noted that in cases of very low flow rate or very low external pressure, no or only low pressure pulses occur, regardless of the number of inlet openings or their individual opening diameters, and the disruptive effect of the pressure pulses increases as the flow rate and/or the external pressure of the inflowing medium increase, and in this respect the inflow openings must be selected based upon the intended use of the valve.

In principle, the medium can be any flowable medium, especially a liquid or a fluid. However, gaseous or optionally even powdery media may also be used.

Inlet openings through which the medium will flow, which are connected in parallel with one another, are configured as a plurality of passages or bored holes arranged in parallel with one another, leading from a first space upstream of the wall through which the inlet openings extend into a second space, i.e., the chamber. Ultimately, this requires the inlet openings to be arranged so as to separate two spaces that are adjacent to one another, so that a medium must flow through the plurality of inlet openings in order to flow from the first chamber into the second chamber.

Preferably, each of the inlet openings is embodied with a flow-through area that is smaller than the outflow area, and the inlet openings together are embodied such that their inflow area is larger than the outflow area. In this connection it is especially advantageous for each of the inlet openings to be embodied such that its flow-through area is smaller than one-fifth, especially smaller than one-tenth of the outflow area. The inlet openings together are preferably embodied with an inflow area that is five times larger, especially ten times larger than the outflow area.

With these advantageous features, therefore, the knowledge that for the greatest possible volume flow into the outflow opening the total of the individual inflow areas of the plurality of inlet openings must be greater than the outflow area so as to direct sufficient medium into the chamber, thereby avoiding cutting off the volume flow into the outlet opening, is reversed. Instead, the plurality of individual inlet openings causes a decrease in pressure, such that on one hand there is sufficient pressure in the chamber to enable an adequate and uniform volume flow into the outlet opening, while on the other hand, the development of pressure pulses in the volume flow into the outlet opening is prevented. While the overall inflow area is therefore advantageously much larger than the outflow area, the separate, individual inflow areas are advantageously much smaller than the outflow area of the outlet opening. The outflow area of the outflow opening in this context is the cross-section of the outlet opening minus the area which is lost to a tappet that preferably extends through the outlet opening.

According to another embodiment of the present invention, there is provided a ball seat valve in which the ball is pre-stressed against the outlet opening by a flexible element. In this case, a wall opposite the seat especially supports the flexible element in the manner of an abutment, with at least some of the inlet openings leading through this wall opposite the seat into the chamber. It is preferable for the ball to be displaceable by means of a tappet, which is guided through the outlet opening and which is displaceable against a holding force of the flexible element via an electromagnetic, manual or motor drive.

The characterizing features are especially preferably applied correspondingly in the concretely described embodiment of a ball seat valve, the ball of which is forced against the seat in the direction of flow of the medium flowing around the ball by a flexible spring. In order to enable flow with an arrangement of this type, a displaceable tappet is correspondingly forced against the ball through the outlet opening. To a very great extent, this type of assembly can cause the particularly rapid development of pressure pulses as a result of the uniform force of the tappet against a flexible spring force and the forces caused by the flowing medium. Especially with an embodiment of this type, therefore, the intermediate connection of a choking device in the form of the large number of inlet openings, preferably having very small individual opening diameters, is advantageous.

The inlet openings are preferably embodied as bored holes, especially laser bored holes. Laser bored holes are especially advantageous when used with media of very low viscosity, as the narrow opening diameter of laser bored holes offers particularly high pressure resistance to the flowing medium, thereby enabling a highly individualized adjustment of the choking of the pressure, based upon the intended purpose of a valve of this type.

It is preferable for at least some of the inlet openings to be configured with a cross-section that tapers in the direction of the chamber, especially with a conically tapered cross-section. This supports both the reduction in pressure and a laminar flow into the chamber.

Especially, at least some of the inlet openings lead into the chamber through a wall that is located opposite the seat and is especially exchangeable. Inlet openings located opposite the seat and the outlet opening offer a particularly uniform flow into the chamber and around the ball. In this connection it is particularly advantageous for the corresponding wall to be exchangeable, for example in the form of a cover which is inserted into the chamber, held closely between its exterior walls, or is slipped on, telescoping over the outside of the exterior walls, because simply exchanging a wall or cover of this type for a wall that has differently seated inlet openings enables a rapid adjustment to specific operating conditions for a planned or modified application.

According to another embodiment of the present invention, there is provided a ball seat valve comprising a valve body with a chamber, inlet openings into the chamber, with said inlet openings together having an inflow area leading into the chamber through which medium can flow, a seat with an outlet opening leading out of the chamber through the valve body, wherein the outlet opening has an outflow area leading out of the chamber through which the medium can flow, and a ball, which is displaceably situated in the chamber so as to open up or block the outlet opening, is specifically preferable when the dimensions of the inlet openings and/or the inflow area can be small enough relative to the physical properties of the medium that an external pressure upstream of the inlet openings is choked to a relatively lower chamber pressure during use.

In this case, the dimensions are preferably selected such that an intensity of pressure pulses upstream of the inlet openings is reduced to a relatively lower intensity of pressure pulses in the chamber.

The intensity of the pressure pulses is preferably reduced by more than 10 percent, preferably by more than 20 percent, especially by more than 40 percent, and/or a differential pressure between the external pressure and the chamber pressure is increased by more than 10 percent, preferably by more than 20 percent, especially by more than 40 percent.

According to another embodiment of the present invention, there is provided a ball seat valve in which diesel fuel is used as the medium, as this enables its advantageous use in so-called diesel rail systems in motor vehicles.

In addition, a method for controlling a valve assembly comprising a ball seat valve, which has a chamber, a seat with an outlet opening, a ball that is displaceable against the seat, and inlet openings that lead into the chamber, is particularly preferable when according to the method a flow rate of a flowing medium is reduced as said medium flows into the chamber through the inlet openings, especially being reduced by more than 10 percent, preferably by more than 20 percent, especially by more than 40 percent by a suitably selected plurality of small inlet openings.

Ordinarily, with known ball seat valves of this type the total inflow area is very large as compared with the outflow area, or $\Sigma A1^* >> A2$, wherein each of the individual inflow areas is also much larger than the outflow area, or $A1^* > A2$. In contrast, the small inlet openings, especially in the form of laser bored holes in the wall opposite the seat, produce the effect of a tubular choke. The small inlet openings and the length of the wall through which flow extends, in which the inlet openings are formed, create a corresponding drop in pressure. Short pressure pulses in the area outside the valve correspondingly arrive evened out or eliminated inside the valve or in the chamber. As a result, the flow at the outflow side does not vary as widely, because a lower and more uniform medium pressure prevails around the ball.

A further advantage of this type of embodiment consists in that the wall or the cover with its many small inlet openings also serves as a filter. Only those particles that are smaller than the cross-section of the bored holes are permitted to flow into the inlet openings.

The benefits that are achieved are therefore a structure that is less sensitive to pressure pulses, a more uniform flow, an elimination of sensitivity of the ball to a bumping of the seat, resulting in a decrease in wear and tear, and a filter effect, which keeps particles of dirt from reaching the interior of the valve.

The above, and other aspects, features and advantages of the present invention will become apparent from the following description read in conduction with the accompanying drawings, in which like reference numerals designate the same elements.

DETAILED DESCRIPTION OF THE PREFERRED EMBODIMENTS

Figure 3:
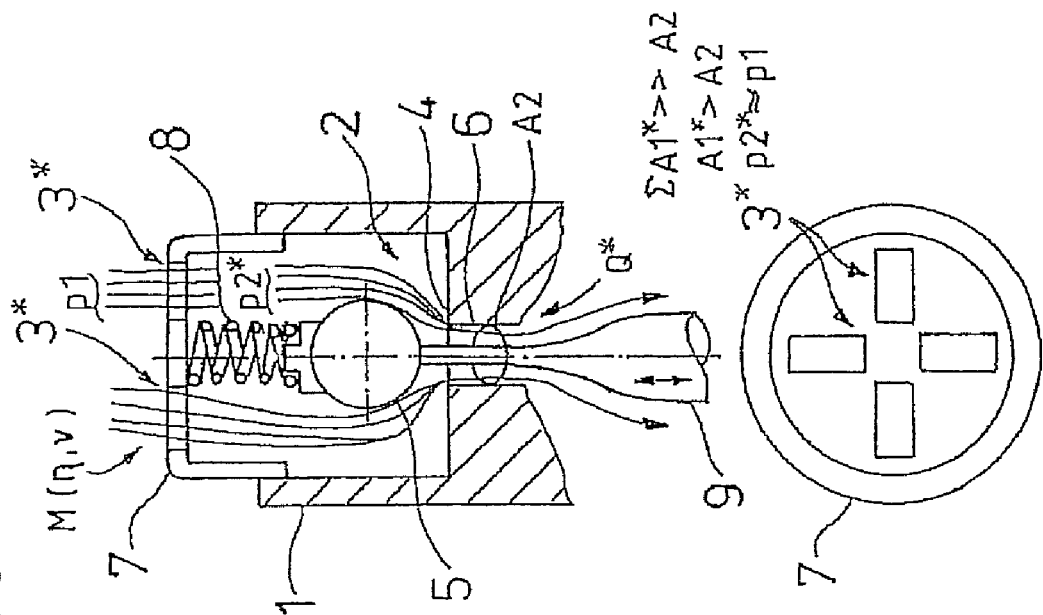
FIG. 3 shows a sectional side view and plan view of a corresponding ball seat valve of the prior art.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figure 1:
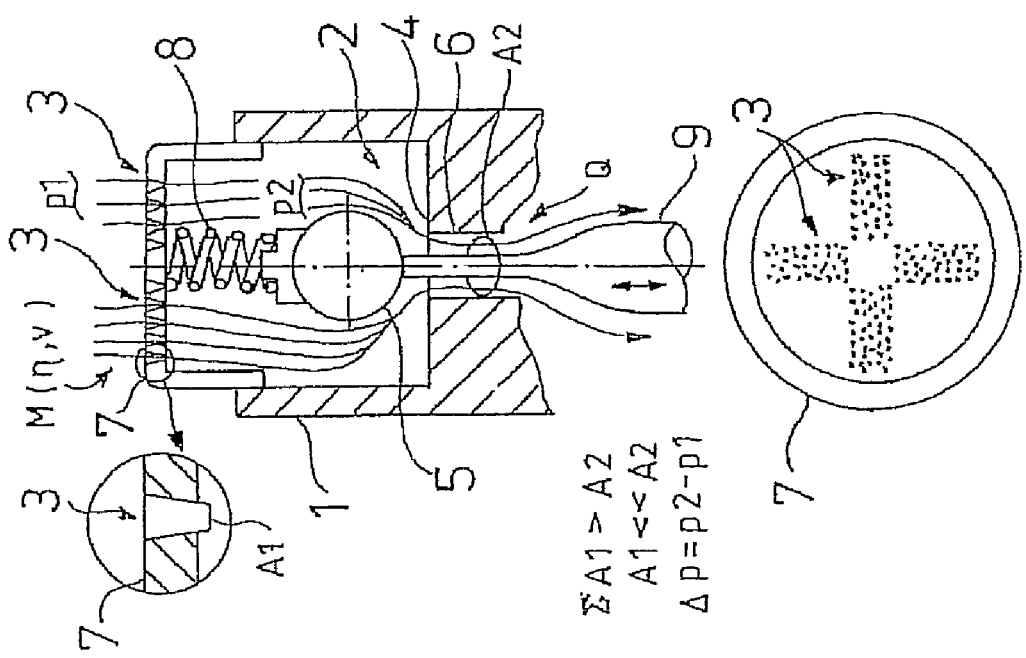
FIG. 1 shows a sectional side view, a sectional enlargement and a plan view of a preferred ball seat valve.

FIG. 1 shows a diagram of a particularly preferable ball seat valve. The ball seat valve has a valve body 1 with a chamber 2. A plurality of relatively small inlet openings 3 lead into the chamber 2 through a cover-like wall 7. Opposite the inlet openings 3, a seat 4 with an outlet opening 6 is formed in the wall of the valve body 1, wherein the outlet opening 6 leads out of the chamber 2 through the valve body 1. A ball 5 is situated in the chamber 2 such that it can be displaced to open up or block the outlet opening 6. A flexible element 8 forces the ball 5 into a normal position in which it blocks the outlet opening 6 in the seat 4 by pre-stressing the ball against the outlet opening 6 from a side opposite the outlet opening 6. A tappet 9, which can be introduced through the outlet opening 6 from the opposite side, can force the ball 5 out of the seat 4 in the opposite direction, against the force of the flexible element 8, thereby opening up the outlet opening 6. When a medium M flows up to the inlet openings 3 with a corresponding external pressure p1, it enters the chamber 2 through the inlet openings 3 and exits the same through the outlet opening 6 when said outlet opening 6 is open.

In the preferred embodiment, rather than a small number of large inlet openings, a very large number of 10, 50 or even many more inlet openings 3 are provided, which allow the medium M to flow into the chamber 2. The diameter of the inlet openings 3 is selected based upon the physical properties and optionally also upon the chemical properties of the medium M. The lower the viscosity $\eta$, as one exemplary physical variable, and the higher the flow rate v and the external pressure p1 of the medium M, the greater the number of inlet openings 3 should be, in combination with a further decreased individual inflow area for the individual inlet openings 3. This results in a chamber pressure p2, which is lower than the external pressure p1.

In a particularly preferred variant, the inlet openings 3 are configured such that their diameter is tapered in the direction of the chamber 2, or with a tapered inflow area A1. In this case, conically tapered inlet openings 3 are particularly advantageous.

In another advantageous variant, the inlet openings 3 are not located in a wall that forms a single piece with the remaining walls that surround the chamber 2. Instead, a preferable embodiment has inlet openings 3 that are formed in the wall 7 shown in the diagram, which is exchangeable or can be attached to the valve body 1 on-site as the last component. In the embodiment illustrated by way of example, the wall 7 is embodied as a cover-like element, which fits precisely inside the interior walls of the valve body 1. In this case, the wall 7 must be expediently attached inside the valve body 1 such that medium M cannot escape from the chamber 2 through a transition point between the wall 7 and the valve body 1, and such that the wall 7 can also preferably be used as a stable abutment for the flexible element 8. The wall 7 therefore forms a stand-alone choking device, which can be exchanged as needed based upon its intended use, so that the wall 7 is the only component that needs to be modified to adapt the entire valve to a different use, while the remaining multitude of components of the ball seat valve can be used without modification.

As is especially apparent in the plan view, a very large number of even 100 or more such inlet openings 3, each with very small individual inflow areas A1, can be created via laser boring as laser bored holes, for example.

In a known embodiment and manner, laser bored holes of this type can be located in selected wall sections, as is known in the art. In the embodiment shown here, for example, four rectangular sections are arranged in a cross pattern in the wall 7 in which the inlet openings 3 are located. A center area is expediently embodied without inlet openings, as this area serves as an abutment for the flexible element 8.

Figure 2:
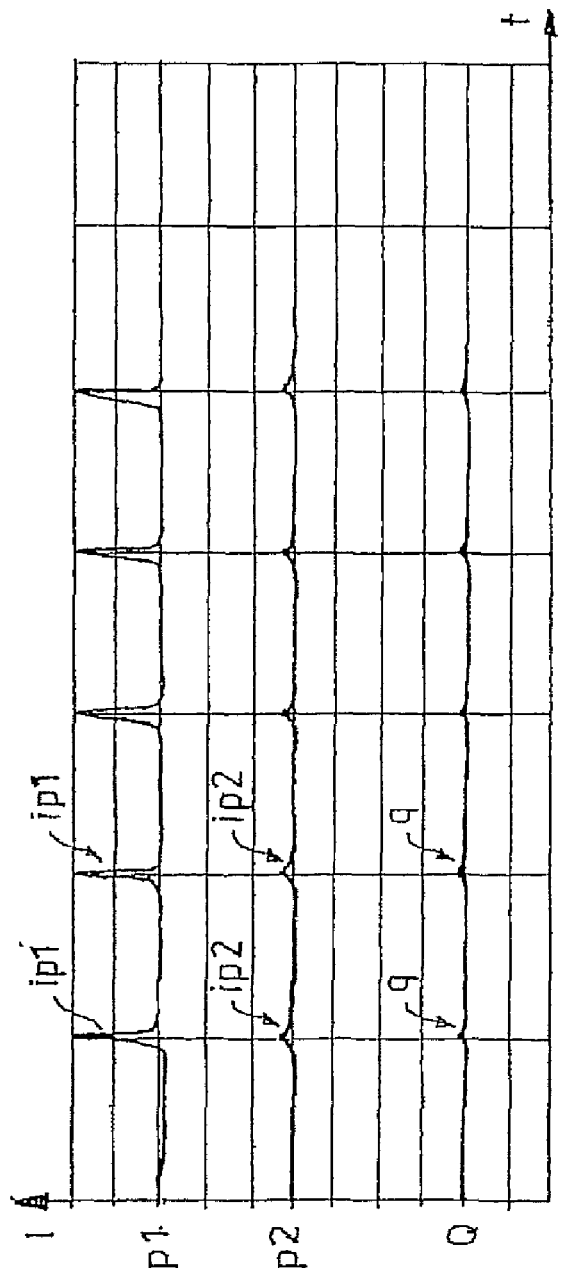
FIG. 2 is a diagram illustrating pressure and flow ratios over time in the area of a ball seat valve of the above type in FIG. 1.
Figure 4:
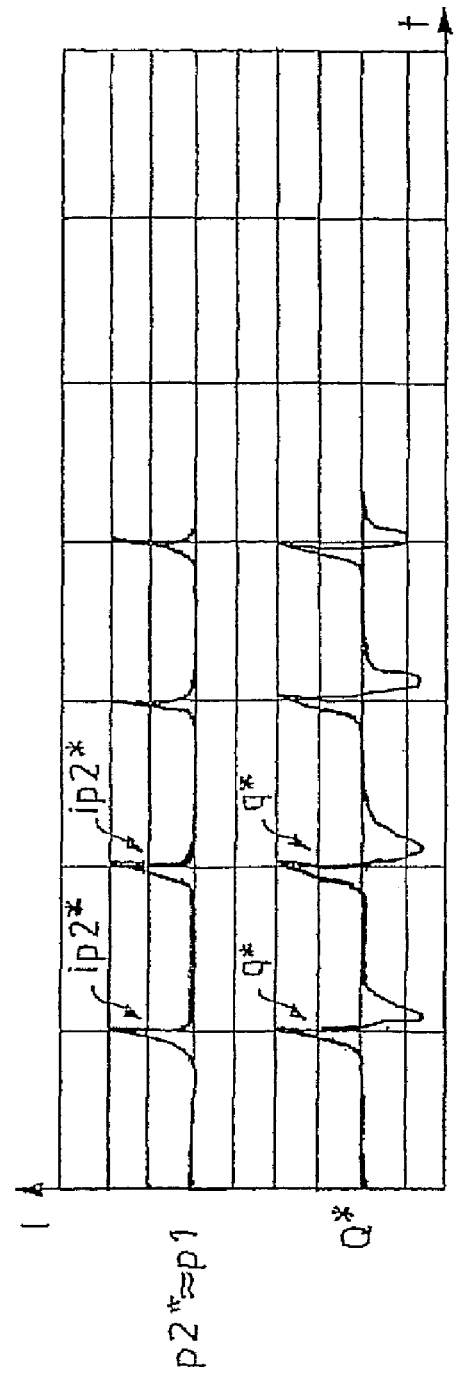
FIG. 4 is a corresponding diagram of flow conditions in a ball seat valve, of the prior art, over time.

FIG. 2 illustrates flow intensities or pulse intensities I, by way of example, in a correspondingly embodied valve over time t. The upper curve represents an exemplary external pressure p1, which has relatively large pressure pulses ip1 at regular time intervals. The center curve represents the chamber pressure p2, which shows pressure pulses ip2 of much lower intensity I as compared with the pressure pulses ip1 of the external pressure p1. Correspondingly, only very slight disruptions or pressure pulses q are found in the volume flow Q of the outlet opening 6, which is represented by the lower curve.

Thus the knowledge that it is advantageous for the total inflow area $\Sigma A1$ of the plurality of inlet openings 3 to be greater than the outflow area A2, in other words A1>A2, is applied. At the same time, however, the correspondingly large number of inlet openings 3, which can optionally comprise several hundred or even more inlet openings 3, results in a reduction of the chamber pressure p2 in relation to the external pressure p1, in other words p2<p1. The level of the pressure difference this creates, $\Delta p=p2-p1$, is thus based essentially upon the number of inlet openings 3 and their respective individual inflow areas A1, dependent upon the flowing medium M to be taken into consideration, along with its physical parameters and optionally its chemical parameters.

In one exemplary experimental structure having conical bored inflow holes as the inlet openings 3, which have an external diameter of 0.1 mm and an internal diameter of 0.08 mm and a material thickness of 0.85 mm, a decrease in pressure of 3.9 bar from the inflowing external pressure p1 to the chamber pressure p2 can be achieved. The flow per inflow or individual bored hole is 0.01 l/min. To ensure a total flow at the open outflow area A2 of 2 l/min, 200 individual bored holes were used.

In the claims, means, or step-plus-function clauses, are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A ball seat valve, comprising:
   (a) a valve body with a chamber;
   (b) a plurality of inlet openings in the chamber, wherein:
      (i) the plurality of inlet openings together have an inflow area leading into the chamber through which a medium can flow, and
      (ii) the plurality of inlet openings are connected to one another in parallel to allow the medium to flow through them simultaneously, and
      (iii) the plurality of inlet openings comprises more than 10 individual inlet openings connected to one another in parallel, and
      (iv) the plurality of inlet openings are arranged in distinct groups;
   (c) a seat with an outlet opening leading out of the chamber through the valve body, wherein the outlet opening has an outflow area leading out of the chamber through which the medium can flow;
   (d) a ball, which is situated in the chamber so as to be displaceable to open up or block the outlet opening; and
   (e) a wall, situated opposite the seat, that supports the flexible element as an abutment, and wherein at least some of the inlet openings lead through this wall opposite the seat into the chamber.

2. The ball seat valve according to claim 1, in which the inlet openings are embodied as bored holes.

3. The ball seat valve according to claim 1, in which at least some of the inlet openings are embodied with a tapered cross-section in the direction of the chamber.

4. The ball seat valve according to claim 1, in which at least some of the inlet openings lead into the chamber through a wall that is opposite the seat and can be exchanged.

5. The ball seat valve according to claim 1, in which diesel fuel is used as the medium.

6. The ball seat valve according to claim 1, in which the ball is pre-stressed against the outlet opening by said flexible element.

7. The ball seat valve according to claim 6, in which the ball can be displaced against a holding force of the flexible element by a displaceable tappet which extends through the outlet opening and is actuated via an electromagnetic, manual or motor drive.

8. The ball seat valve according to claim 1, wherein:
   (iv) each of the inlet openings is configured such that its passage area is smaller than the outflow area; and
   (v) the inlet openings together are configured such that their combined inflow area is larger than the outflow area.

9. The ball seat valve according to claim 8, in which each of the inlet openings is embodied with a flow-through area that is smaller than one-fifth of the outflow area.

10. The ball seat valve according to claim 8, in which the inlet openings together are embodied with an inflow area that is equal to or more than five times larger than the outflow area.

11. A ball seat valve, said ball seat valve comprising:
   (a) a valve body with a chamber;
   (b) a plurality of inlet openings into the chamber, wherein the inlet openings together have an inflow area leading into the chamber through which a medium can flow, and wherein the dimensions of the inlet openings and/or the inflow area are small enough relative to physical properties ($\eta$, $v$) of the medium that an external pressure upstream of the inlet openings is choked to a lower chamber pressure, and wherein the plurality of inlet openings are arranged in distinct groups;

(c) a seat with an outlet opening leading out of the chamber through the valve body, wherein the outlet opening has an outflow area leading out of the chamber through which the medium can flow;

(d) a ball, which is situated in the chamber so as to be displaceable to open up or block the outlet opening; and (e) a wall, situated opposite the seat, that supports the flexible element as an abutment, and wherein at least some of the inlet openings lead through this wall opposite the seat into the chamber.

12. The ball seat valve according to claim 11, in which diesel fuel is used as the medium.

13. The ball seat valve according to claim 11, in which dimensioning is selected such that an intensity of pressure pulses upstream of the inlet openings is reduced to a lower intensity of pressure pulses inside the chamber.

14. The ball seat valve according to claim 13, in which the intensity of the pressure pulses is reduced by more than 10 percent, and a differential pressure ($\Delta p$) between the external pressure and the chamber pressure is increased by more than 10 percent.

15. A method for controlling a valve assembly, wherein the valve assembly further comprises a ball seat valve having a chamber, a seat with an outlet opening, a ball that can be displaced against the seat, and a set of inlet openings that lead into the chamber, said method comprising the step of:

(a) reducing the flow rate of a flowing medium as said medium flows through said set of inlet openings into said chamber by more than 10 percent, wherein the set of inlet openings are arranged in distinct groups and not uniformly distributed in the wall; and (b) supporting a flexible element as an abutment by utilizing a wall situated opposite the seat, wherein at least some of the set of inlet openings lead through the wall opposite the seat into the chamber.

16. The method of claim 15, wherein said flowing medium is diesel fuel.

17. The method of claim 15, further comprising the step of:
(c) utilizing bored holes as the embodiment for the inlet openings.

18. The method of claim 15, further comprising the step of:
(c) embodying at least some of the inlet openings with a tapered cross-section in the direction of the chamber.

19. The method of claim 15, further comprising the step of pre-stressing the ball against the outlet opening by the flexible element.

20. The method of claim 19, further comprising the step of:
(c) displacing the ball against a holding force of the flexible element by a displaceable tappet which extends through the outlet opening and is actuated via an electromagnetic, manual or motor drive.

\* \* \* \* \*

UNITED STATES PATENT AND TRADEMARK OFFICE
CERTIFICATE OF CORRECTION

PATENT NO. : 8,322,371 B2
APPLICATION NO. : 12/538031
DATED : December 4, 2012
INVENTOR(S) : Strobel et al.

It is certified that error appears in the above-identified patent and that said Letters Patent is hereby corrected as shown below:

On the title page item (75) Inventors:

Gerd Strobel, "Villingen-Schweningen" should be changed to --"Villingen-Schwenningen"--

Florian Schulz, "Villingen-Schweningen" should be changed to --"Villingen-Schwenningen"--

Signed and Sealed this
Fifth Day of March, 2013

Teresa Stanek Rea
*Acting Director of the United States Patent and Trademark Office*